(12) United States Patent
Dudding et al.

(10) Patent No.: US 7,229,088 B2
(45) Date of Patent: Jun. 12, 2007

(54) SHACKLE ASSEMBLY

(75) Inventors: Ashley Thomas Dudding, Yorkville, IL (US); Gonzalo Luna Astudillo, Lisle, IL (US); Jerome Lim Cortez, Tinley Park, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 10/914,978

(22) Filed: Aug. 10, 2004

(65) Prior Publication Data

US 2005/0189734 A1    Sep. 1, 2005

Related U.S. Application Data

(63) Continuation of application No. 10/280,120, filed on Oct. 24, 2002, now abandoned.

(51) Int. Cl.
*B60G 1/00*    (2006.01)
(52) U.S. Cl. .......................... 280/124.17; 280/124.175
(58) Field of Classification Search ......... 280/124.163, 280/124.17, 124.175; 267/271, 270, 269, 267/260
See application file for complete search history.

(56) References Cited

U.S. PATENT DOCUMENTS

| | | | | |
|---|---|---|---|---|
| 1,190,966 | A | * | 7/1916 | Sprague ..................... 267/171 |
| 1,350,110 | A | * | 8/1920 | Oltsch ........................ 267/245 |
| 1,427,144 | A | * | 8/1922 | Wynne ........................ 267/53 |
| 1,487,427 | A | | 3/1924 | Asbury |
| 2,004,712 | A | * | 6/1935 | Thiry ......................... 403/226 |
| 2,048,256 | A | * | 7/1936 | Geyer ......................... 403/228 |
| 2,297,483 | A | * | 9/1942 | Kuhne ........................ 403/224 |
| 2,802,663 | A | * | 8/1957 | Hovind ........................ 267/28 |
| 3,030,101 | A | | 4/1962 | McIntosh |
| 3,508,745 | A | * | 4/1970 | Deane ......................... 267/281 |
| 4,109,979 | A | * | 8/1978 | Estaque ....................... 384/582 |

(Continued)

FOREIGN PATENT DOCUMENTS

| | | |
|---|---|---|
| DE | 378963 | 8/1923 |
| FR | 569 371 A | 4/1962 |
| GB | 215 383 A | 10/1924 |
| GB | 1202482 | 8/1970 |
| GB | 2 195 589 A | 4/1988 |

*Primary Examiner*—David R. Dunn
*Assistant Examiner*—Joselynn Y. Sliteris
(74) *Attorney, Agent, or Firm*—Cook, Alex, McFarron, Manzo, Cummings & Mehler Ltd.

(57) ABSTRACT

A shackle assembly is shown to include a shackle bracket, wear pads, a shackle stop, shackle plates and elastomer bushings. The shackle bracket includes legs forming portions thereof, which serve as contact surfaces for the wear pads and the shackle plates. By providing conical and lateral stiffness, the shackle bracket legs allow for the use of a more versatile elastomer bushing. The elastomer bushing preferably includes voids vertically separated with respect to each other and the elastomer layer preferably is in the form of a bowtie-shaped configuration, which enhances vertical, conical and torsional performance. A first redundancy feature is in the form of a shackle stop secured between the shackle plates. The shackle stop provides longitudinal control of the axle in the event the opposite limb of the leaf spring is broken, the vehicle is generally traveling in a given direction and the vehicle is subject to deceleration. A second redundancy feature is in the form of fingers forming portions of the shackle plates, which provides longitudinal control of the axle under the same conditions, but when the vehicle is generally traveling in an opposite direction. The redundancy features are activated under other conditions as well.

39 Claims, 3 Drawing Sheets

U.S. PATENT DOCUMENTS 4,412,690 A * 11/1983 Prokop et al. .............. 280/686
4,718,693 A * 1/1988 Booher ................ 280/124.107
4,872,653 A * 10/1989 Chuchua .................... 267/271
5,836,606 A * 11/1998 Spoto et al. .......... 280/124.175
6,129,369 A * 10/2000 Dudding .............. 280/124.175
6,485,040 B1 * 11/2002 Dudding .............. 280/124.175

* cited by examiner

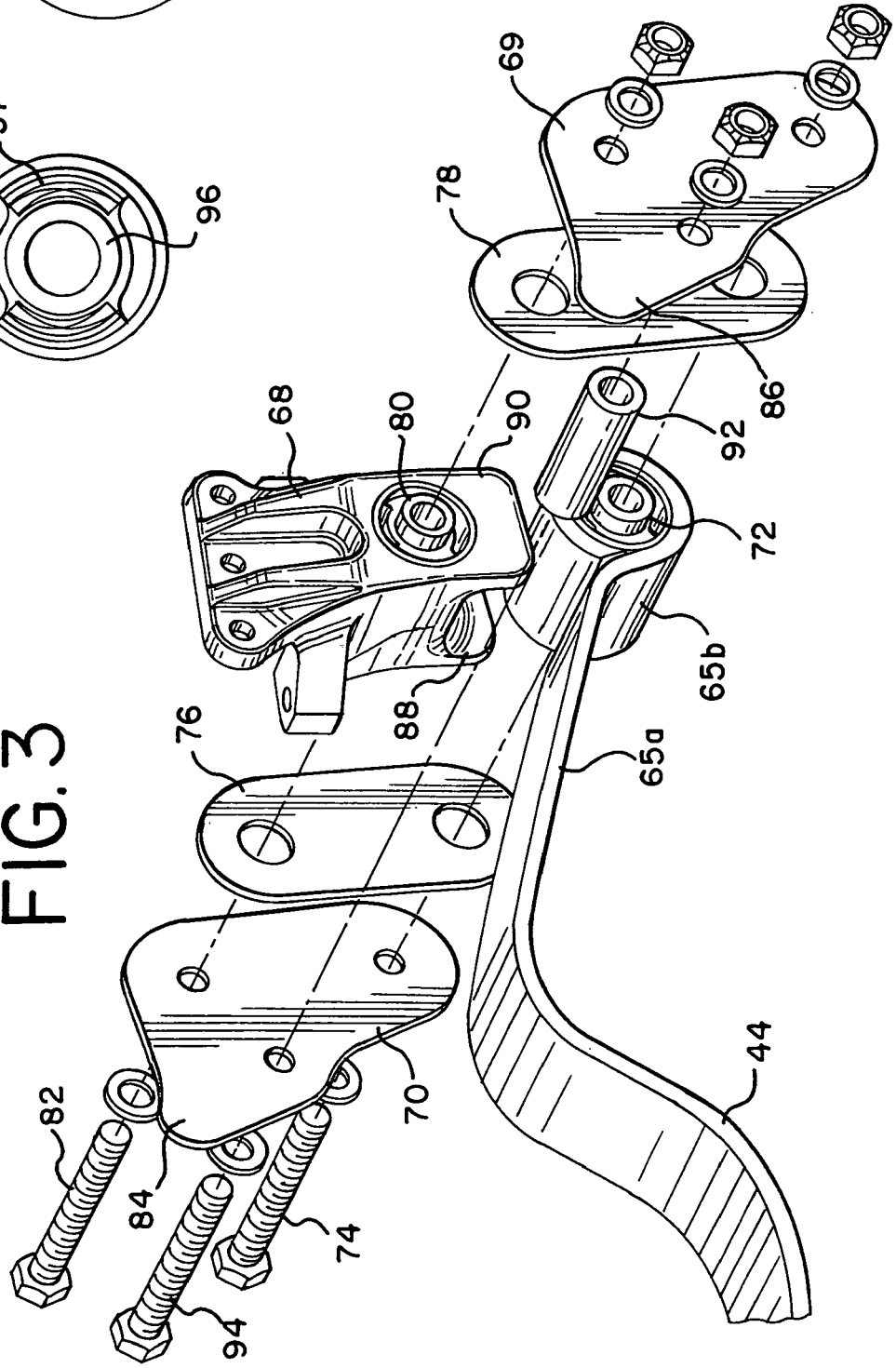

SHACKLE ASSEMBLY

This is a continuation of application Ser. No. 10/280,120, filed on Oct. 24, 2002, now abandoned.

BACKGROUND OF THE INVENTION

The present invention relates generally to vehicle components, and more particularly, to shackle assemblies used to connect vehicle suspension components to a vehicle frame.

Shackle assemblies are typically used in a variety of vehicle suspensions to connect vehicle suspension components to a vehicle frame. Conventional shackle assemblies are typically used in leaf spring front suspensions, but typically do not use elastomer bushings. In a conventional shackle assembly, the suspension side loads are carried through the conical loading of the non-rubber bushings through the shackle plates. These shackle assemblies primarily rely on the bushing properties and shackle plate stiffness to provide for suspension lateral and conical stiffness.

One recognized problem of conventional shackle assemblies is their ineffectiveness in providing sufficient suspension lateral and conical stiffness, primarily due to the large distance spanned between the shackle plates. Conventional assemblies cause the suspension to be laterally compliant due to conical deflections in the bushings and bending in the shackle plates.

In order to accommodate for this lateral stiffness, conventional shackle assemblies ordinarily rely on the uniform rigidity and shape of the non-rubber bushings and/or shackle plates to react to side loads. Those skilled in the art will recognize that conventional shackle assemblies require strong, stiff, heavy, and, therefore, costly bushings and shackle plates. Those skilled in the art will further recognize that the non-rubber (i.e., strictly metal) bushings used in conventional assemblies are unable to provide vertical compliance. Accordingly, conventional shackle assemblies could undesirably induce compressive stress in the leaf spring.

Another item not present in the prior art is that conventional shackle assemblies typically do not incorporate built-in redundancy features to help provide vehicle control in the event of a broken spring. Suspensions utilizing conventional shackle assemblies traditionally require an additional leaf with "military wrap." Those skilled in the art will recognize that these and similar redundancy features add cost, weight, and complexity to the suspension.

In view of the foregoing, it is desirable to develop a shackle assembly that provides sufficient suspension lateral and conical stiffness.

It is further desirable to develop a shackle assembly that reduces the reliance on the uniform rigidity and shape of bushings and shackle plates to react to side loads.

It is further desirable to develop a shackle assembly that allows for lighter, and, therefore, less costly bushings and shackle plates to be incorporated as component parts thereof.

It is further desirable to develop a shackle assembly having versatile, elastomer bushings with voids oriented to enhance vertical, conical and torsional performance.

It is further desirable to design a shackle assembly that permits additional suspension travel during rebound, or an overhang condition (i.e., an extreme rebound condition).

It is further desirable to develop a shackle assembly that comprises light, and, therefore, low cost redundancy features.

It is further desirable to develop a shackle assembly that incorporates built-in redundancy features.

It is further desirable to develop a shackle assembly that may be accommodated by any conventional leaf spring suspension system (front and/or rear), and at the front and/or rear end of the leaf spring.

These and other desired benefits of the preferred forms of the invention will become apparent from the following description. It will be understood, however, that a device or assembly could still appropriate the claimed invention without accomplishing each and every one of these desired benefits, including those gleaned from the following description. The appended claims, not these desired benefits, define the subject matter of the invention. Any and all benefits are derived from the preferred forms of-the invention, not necessarily the invention in general.

BRIEF SUMMARY OF THE INVENTION

The present invention relates to a unique shackle assembly. In its preferred form, the shackle assembly includes elastomer bushings to enhance suspension travel without inducing compressive stress to the associated leaf spring. The shackle assembly also preferably includes built-in redundancy features. The shackle assembly comprises a shackle bracket secured between two wear pads and two shackle plates, and a bushing incorporated therein. The shackle bracket includes downwardly extending legs, which serve as contact surfaces for the wear pads and shackle plates and, thereby provide lateral and conical stiffness. These shackle bracket legs allow for the use of a more versatile, elastomer bushing having voids oriented to enhance vertical, torsional and conical performance. The elastomer bushing is preferably in the form of a bowtie-shaped bushing. A first redundancy feature is in the form of a laterally extending shackle stop secured between the shackle plates at one side thereof. The shackle stop, which is preferably in the form of a tube, provides longitudinal control of the axle in the event the opposite limb of the leaf spring breaks, the vehicle is moving in a first direction and the vehicle is subjected to deceleration. In that regard, and under those circumstances, the shackle stop will contact the shackle bracket legs. A second redundancy feature is in the form of fingers forming a portion of the shackle plates positioned on the same side of the shackle plates as the shackle stop. The fingers preferably extend vertically upwardly and contact the bottom of the adjacent frame rail in the event the opposite limb of the leaf spring breaks, the vehicle is moving in a second direction generally opposite the first direction, and is subject to deceleration.

BRIEF DESCRIPTION OF THE SEVERAL VIEWS OF THE DRAWING

Throughout this description, reference will be made to the accompanying views of the drawing wherein like subject matter has like reference numerals, and wherein:

FIG. 3 is an exploded isometric view of a shackle assembly constructed in accordance with the principles of the present invention and the distal end portion of its associated leaf spring;

FIG. 4 is an elevational view of a bushing preferably used as a component of the shackle assembly; and FIG. 5 is an elevational view of portions of the bushing illustrated in FIG. 4.

DETAILED DESCRIPTION OF THE INVENTION

Figure 1:
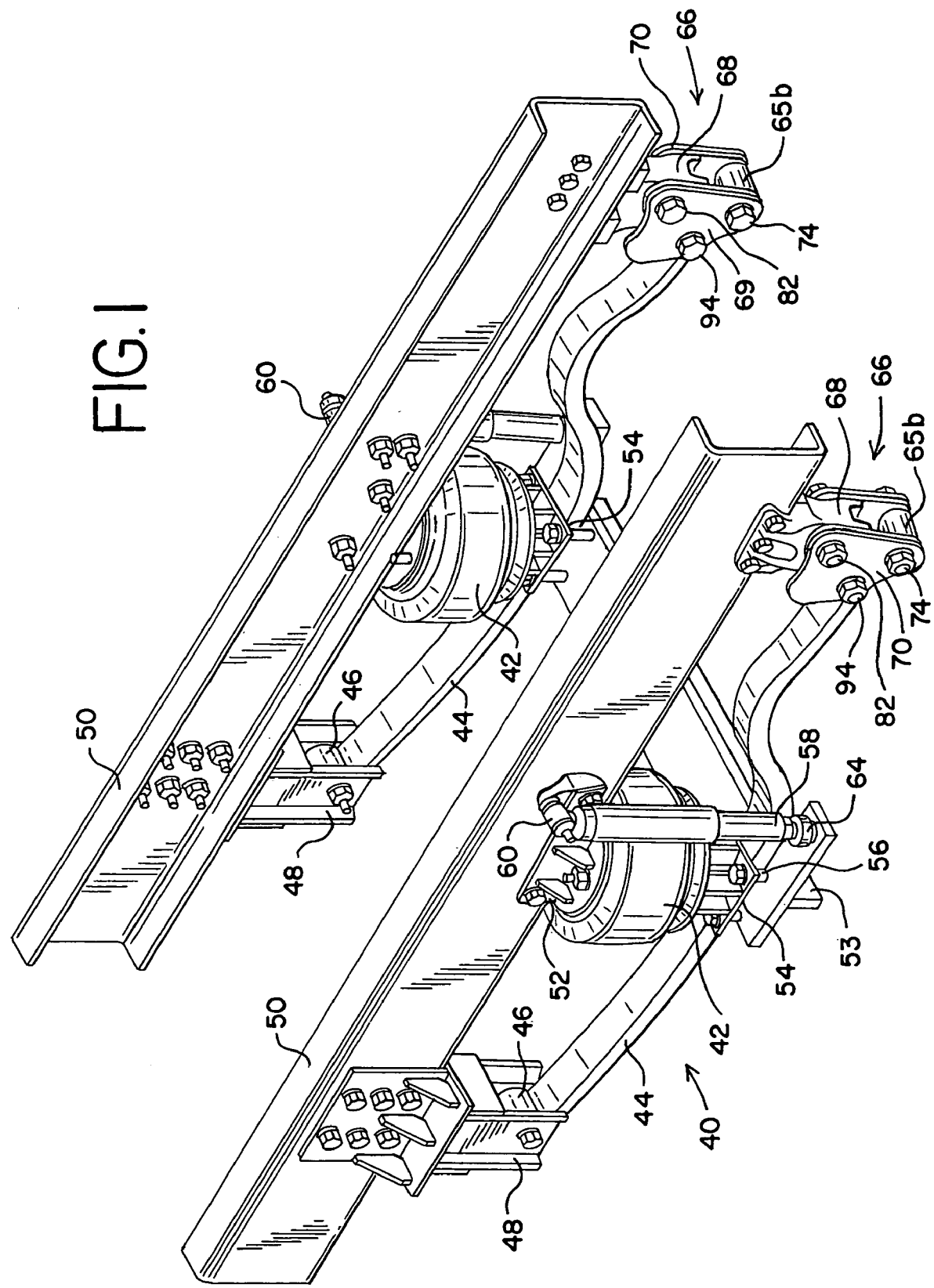
FIG. 1 is an isometric view of the suspension system for a vehicle such as a light or heavy duty truck wherein the suspension system includes the novel shackle assembly of the present invention.
Figure 2:
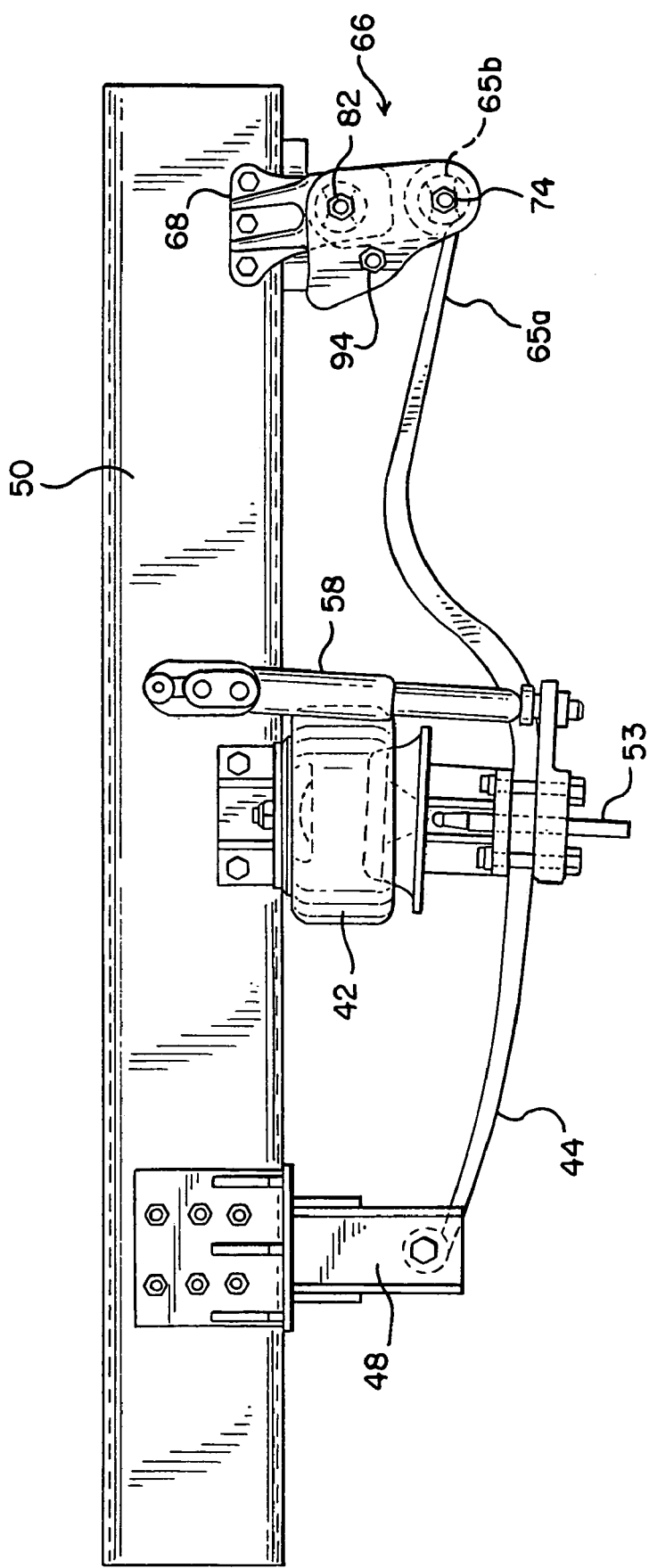
FIG. 2 is an elevational view of the suspension system illustrated in FIG. 1.

FIGS. 1–2 illustrate a steering axle/front suspension system generally designated by reference number 40. It will be seen and understood that the construction of this suspension system on one side is duplicated on the opposite side of the vehicle. It will further be understood that, although the shackle assembly forming the subject matter of the present invention is shown as being positioned at the rear end of a leaf spring included with the suspension system, it could have equal utility at the opposite end of the leaf spring.

Furthermore, while the illustrated embodiment is directed to a combination air-mechanical suspension, it will be understood by those skilled in the art that the present invention has utility in strictly mechanical suspensions as well. Still further, the present invention is not limited to single-leaf leaf spring suspensions, and is not limited to front suspensions, as illustrated.

The active or functional components of the front suspension system 40 comprise two air springs 42—42 and two single-leaf leaf springs 44—44. Each single-leaf leaf spring 44 is provided with an eye 46 integrally formed at the proximal end thereof. Each eye 46 is pivotally connected to a standard or existing frame hanger indicated generally by reference numeral 48. As shown, the frame hangers 48 are mounted on each fore-and-aft extending chassis frame member 50. Each frame member 50 is constructed as a conventional C-shaped rail.

An upper air spring support bracket 52 is mounted on each chassis frame member 50, and in the illustrative embodiment, is shown as being positioned at a location that is over one end of the vehicle front axle 53 and over the single-leaf leaf spring 44 on that side. The top portion of each air spring 42 is attached to its air spring support bracket 52. The underside of each air spring 42 is mounted on an air spring support pad 54 which, in the illustrative embodiment, is attached to the axle 53 extending from one side of front suspension system 40 to the other side. As shown, the single-leaf leaf spring 44 is positioned between the air spring support pad 54 and the axle 53. Typically, the single-leaf leaf spring is attached to the vehicle axle 53 in any known manner, such as by bolts 56—56, and it preferably assumes the form shown and described in U.S. Pat. No. 5,938,221, issued Aug. 17, 1999, the disclosure of which is incorporated herein by reference.

A shock absorber 58 is also included within each side of front suspension system 40. The shock absorber 58 is pivotally connected at its upper end to a bracket 60 mounted on frame member 50 and is attached at its bottom end to axle 53 by a fitting 64.

The distal end portion 65a of each single-leaf leaf spring 44 having an eye 65b is connected to vehicle frame 50 by a novel shackle assembly 66. Shackle assembly 66 includes, preferably among other things, a shackle bracket 68 fixedly mounted to vehicle frame 50 and depending inner and outer shackle plates 69, 70.

Referring now to FIG. 3, an elastomer (e.g., rubber) bushing 72 with voids oriented such that the voids are vertically spaced with respect to each other is shown installed within the leaf spring eye 65b and between shackle plates 69, 70 by fastener 74. Bushing 72 preferably has a bowtie-shape configuration. Fastener 74 is inserted through and connects shackle plate 70, wear pad 76, bushing 72 installed in leaf spring eye 65b, wear pad 78 and shackle plate 69. A second elastomer bushing 80 with voids oriented such that the voids are vertically spaced with respect to each other is shown to be installed within the shackle bracket 68 and between shackle plates 69, 70 and wear pads 76, 78 by fastener 82. Bushing 80 also preferably has a bowtie-shape configuration. Fastener 82 is inserted through and connects shackle plate 70, wear pad 76, bushing 80 (installed into a bore positioned within shackle bracket 68), wear pad 78 and shackle plate 69. The functional aspects of elastomer bushings 72, 80 will be discussed in greater detail with respect to FIGS. 4–5.

Shackle plates 69, 70 include upwardly extending fingers 84, 86 forming portions of the shackle plates and positioned on one side thereof. FIG. 3 shows fingers 84, 86 positioned on the preferred axle sides of shackle plates 69, 70. Each finger 84, 86 provides a novel redundancy feature, wherein the fingers 84, 86 will contact the bottom of frame rail 50 during certain conditions when the opposite limb of the same side leaf spring is broken. In particular, in the event that the opposite spring limb is broken, the shackle plate fingers 84, 86 will contact the bottom of frame member 50 and prevent the axle 53 from excessive longitudinal movement relative to the chassis when the vehicle is moving in a first general direction and is subjected to deceleration (e.g., braking).

For example, and as illustrated in FIG. 3, when shackle assembly 66 connects the rear end of a leaf spring to frame 50 and shackle plate fingers 84, 86 are positioned on the axle sides of shackle plates 69, 70, in the event that the front limb of the leaf spring positioned on the same vehicle side breaks, and in the event the vehicle is in reverse, traveling in a generally rearward direction and is subject to deceleration, shackle plates 69, 70 will pivot at fastener 82 until fingers 84, 86 contact against the bottom of frame rail 50.

In the event the shackle assembly connects the rear end of the leaf spring to the frame rail, and is oriented such that the shackle plate fingers are positioned on the axle side of the shackle plate, and in the event there is front limb failure on the driver's side (drag link side), drag link forces to steer the vehicle to the left (for typical right-hand drive vehicles used in North America) will cause the axle to the roll forward on that side. Under such circumstances, the shackle plate fingers 84, 86 will contact the bottom of frame rail 50 to prevent any further motion beyond the stopping point (i.e., the point where contact is made).

On the other hand, when shackle assembly 66 connects the front end of a leaf spring to frame 50, and the shackle plates are oriented such that shackle plate fingers 84, 86 are positioned on the sides of the shackle plates closest to the vehicle axle, in the event the rear limb of the leaf spring positioned on the same vehicle side breaks, and in the event the vehicle is in drive, traveling in a generally forward direction and is subject to deceleration, the shackle plates will pivot at the fastener that pivotally connects the plates to the shackle bracket until the fingers, which extend upward and, in this case, towards the axle, contact the bottom of the vehicle frame rail.

In the event the shackle assembly connects the front end of the leaf spring to the frame rail and is oriented such that the shackle plate fingers are positioned on the axle side of the shackle plate, and in the event there is rear limb failure on the driver's side, and the vehicle is turned to the right, it will cause the axle to roll backward on that side. Under such circumstances, the shackle plate fingers 84, 86 will contact the bottom of frame rail 50 to prevent any further motion beyond the stopping point (i.e., the point where contact is made).

Those skilled in the art will recognize that this limitation in axle movement allows for greater steering control of the vehicle. Those skilled in the art will further recognize that scenarios other than those described above may arise and the operation would be different. For instance, the shackle plates can also be oriented such that the shackle plate fingers are positioned on the sides of the shackle plates furthest from the vehicle axle, but this orientation would present design issues and would operate in a correspondingly different fashion. Other variables would affect operation as well.

The shackle bracket 68 includes legs 88, 90, which provide a wear surface and load reaction point for the shackle wear pads 76, 78, and, in turn, a load reaction point for shackle plates 69, 70. Those skilled in the art will appreciate that side loads are reacted through legs 88, 90, wear pads 76, 78, and shackle plates 69, 70, thereby providing a system that is both laterally and conically stiff (as defined about the longitudinal axis). With this construction, bushing 72 is not required to react to side loads through conical loading, thereby allowing the bushing to be more versatile in accommodating other loads as will be discussed in greater detail with respect to FIGS. 4–5. Those skilled in the art will further appreciate that wear pads 76, 78 further alleviate stress to shackle plates 69, 70, leaf spring eye 65b, and shackle bracket 68.

Legs 88, 90 of shackle bracket 68 further provide a reaction point for a laterally extending shackle stop 92 shown in the form of a tube. Shackle stop 92 is secured between shackle plates 69, 70 by fastener 94, and is positioned at the same side of the shackle plates at the shackle plate fingers 84, 86. In the preferred case, the shackle stop 92 is positioned in the side of shackle plates 69, 70 closest to the vehicle axle. Shackle stop 92 also serves as a redundancy feature, thereby providing longitudinal control of the axle in the event that the opposite limb of the same vehicle side leaf spring 44 is broken.

In that regard, as shown in FIG. 3, when shackle assembly 66 connects the rear end of a leaf spring to frame 50 and the shackle stop is positioned on the side of the shackle plates closest to the vehicle axle, in the event the front limb of the leaf spring positioned on the same vehicle side breaks, and in the event the vehicle is in drive, traveling in a generally forward direction and is subject to deceleration, shackle plates 69, 70 will pivot at fastener 82 until shackle stop 92 contacts the legs 88, 90 of shackle bracket 68. Further movement will be prevented.

In the event the shackle assembly connects the rear end of the leaf spring to the frame rail and is oriented such that the shackle stop is positioned on the axle side of the shackle plate, and in the event there is front limb failure on the-driver's side and the vehicle is turned to the right (for typical right-hand drive vehicles used in North America), the axle will be caused to roll backward on that side. Under such circumstances, the shackle stop 92 will contact the legs 88, 90 of the shackle bracket 68 to prevent any further motion beyond the stopping point (i.e., the point where contact is made).

On the other hand, when shackle assembly 66 connects the front end of a leaf spring to frame 50 and is oriented such that the shackle stop is positioned on the axle sides of the shackle plates, in the event the rear limb of the leaf spring breaks, and in the event the vehicle is in reverse, traveling in a generally rearward direction and is subject to deceleration, the shackle plates will pivot at the fastener that pivotally connects the plates to the shackle bracket until the shackle stop 92 contacts the legs 88, 90 of the shackle bracket 68. Further movement is thereby prevented.

In the event the shackle assembly connects the front end of the leaf spring to the frame rail and is oriented such that the shackle stop is positioned on the axle side of the shackle plate, and in the event there is rear limb failure on the driver's side (drag link side), drag link forces to steer the vehicle to the left (for typical right-hand drive vehicles used in North America) will cause to the axle to roll forward on that side. Under such circumstances, the shackle stop 92 will contact legs 88, 90 of the shackle bracket 68 to prevent any further motion beyond the stopping point (i.e., the point where contact is made).

Those skilled in the art will recognize that this limitation in axle movement allows for greater steering control of the vehicle. Those skilled in the art will further recognize that scenarios other than those described above may arise and the operation would be different. For instance, the shackle plates can also be oriented such that the shackle plate fingers are positioned on the sides of the shackle plates furthest from the vehicle axle, but this orientation would present design issues and would operate in a correspondingly different fashion. Other variables would affect operation as well.

Referring now to FIGS. 4–5, because legs 88, 90 of shackle bracket 68 provide sufficient conical stiffness for reacting to side loads as discussed above, the preferred and illustrated elastomer bushings 72, 80 can be installed within shackle bracket 68 and leaf spring eye 65b, respectively, and still achieve adequate performance. As shown in FIGS. 4–5, bushings 72, 80 include an inner metal sleeve 96, an elastomer layer 97 enveloping the inner metal sleeve and an outer metal sleeve 98. The elastomer layer 97 has a bowtie-shaped configuration and two vertically spaced voids are positioned between the elastomer layer and outer metal sleeve 98 at generally upper and lower sides of the bushing.

Those skilled in the art will appreciate that the voids present within the bushings 72, 80 allow for increased vertical compliance, thereby providing additional vertical travel for suspension. More specifically, this additional vertical suspension travel helps to reduce the potential of spring damage due to reverse loading, while, at the same time, providing for better ride quality. Those skilled in the art will further recognize that this vertical compliance is particularly desirable where the length of the spring is restricted and where it is difficult to achieve desired axle travel due to stress limitations in the spring material. In hybrid air-spring suspensions, such as the suspension illustrated in FIGS. 1 and 2, this is further desirable in situations where the air spring has a tendency to push the spring into reversal during rebound conditions, including axle overhang.

Those skilled in the art will further recognize that the elastomer layer 97 enveloping the inner metal sleeve 96 of the bowtie bushings 72, 80 allows for increased torsional compliance (defined about the lateral axis). More specifically, this configuration significantly decreases auxiliary stiffening of the suspension vertical rate due to winding up of the torsional stiffness of the bushings. Additionally, the elastomer 97 tolerates large torsion angles, thereby allowing increased spring deflection.

Those skilled in the art will further appreciate that the elastomer layer 97 enveloping the inner metal sleeve of bushings 72, 80 is conically compliant (defined about a longitudinal axis).

While this invention has been described with reference to certain illustrative aspects, it will be understood that this description shall not be construed in a limiting sense. Rather, various changes and modifications can be made to the illustrative aspects without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A shackle assembly for connecting a vehicle suspension to a vehicle frame member, the vehicle suspension being further connected to a vehicle axle, said shackle assembly comprising:
   a shackle bracket mounted to said vehicle frame member;
   a first shackle plate pivotally connected to said shackle bracket having a redundancy feature in the form of a first shackle plate finger forming part of said first shackle plate and extending vertically upwardly towards said vehicle frame member, said first shackle plate finger being positioned on one side of said first shackle plate and further being constructed and positioned to contact said vehicle frame and thereby prevent further pivoting of said first shackle plate in the event of a particular vehicle condition when said vehicle is traveling in a predetermined direction and when said vehicle is subjected to a predetermined force; and
   a second shackle plate pivotally connected to said shackle bracket having a redundancy feature in the form of a second shackle plate finger forming part of said second shackle plate and extending vertically upwardly towards said vehicle frame member, said second shackle plate finger being positioned on one side of said second shackle plate and further being constructed and positioned to contact said vehicle frame and thereby prevent further pivoting of said second shackle plate in the event of said particular vehicle condition when said vehicle is traveling in said predetermined direction and when said vehicle is subjected to said predetermined force.

2. The shackle assembly as defined by claim 1 wherein said first shackle plate and said second shackle plate share a common pivot axis with respect to their pivotal connection with said shackle bracket.

3. The shackle assembly as defined by claim 1 further comprising a bushing installed within a bore positioned in said shackle bracket and a fastener inserted through said bushing, said fastener further being inserted through a bore positioned in said first shackle plate and through a bore positioned in said second shackle plate, and wherein said bushing and fastener enable said first and second shackle plates to be pivotally connected to said shackle bracket.

4. The shackle assembly as defined by claim 3 wherein the bushing is an elastomer bushing.

5. The shackle assembly as defined by claim 4 wherein the bushing has voids.

6. The shackle assembly as defined by claim 5 wherein the bushing is a bowtie bushing.

7. The shackle assembly as defined by claim 1 wherein said shackle bracket further comprises a downwardly extending leg forming a portion thereof, said leg being configured and positioned to provide lateral stiffness to said vehicle suspension.

8. The shackle assembly as defined by claim 7 wherein said shackle bracket further comprises another downwardly extending leg forming a portion thereof, said another leg being configured and positioned to provide lateral stiffness to said vehicle suspension.

9. The shackle assembly as defined by claim 8 further comprising a first wear pad positioned between said first shackle plate and said leg, and a second wear pad positioned between said second shackle plate and said another leg.

10. The shackle assembly as defined by claim 1 further comprising a first wear pad positioned between said first shackle plate and said shackle bracket, and a second wear pad positioned between said second shackle plate and said shackle bracket.

11. The shackle assembly as defined by claim 1 further comprising another redundancy feature in the form of a laterally extending member connecting said first and second shackle plates and being positioned between and on said one side of said first and second shackle plates and being constructed and positioned to contact said shackle bracket and thereby prevent further pivoting of said first and second shackle plates in the event of said particular vehicle condition and when said vehicle is traveling in a direction generally opposite said predetermined direction and when said vehicle is subject to said predetermined force.

12. The shackle assembly as defined by claim 11 wherein said laterally extending member comprises a tube with a fastener extending through said tube.

13. The shackle assembly as defined by claim 11 wherein said shackle bracket further comprises a downwardly extending leg forming a part thereof, said leg being configured and positioned to provide a contact surface for said laterally extending member.

14. The shackle assembly as defined by claim 13 wherein said shackle bracket further comprises another downwardly extending leg forming a part thereof, said another leg being configured and positioned to provide another contact surface for said laterally extending member.

15. A shackle assembly for connecting a vehicle suspension to a vehicle frame member, the vehicle suspension being further connected to a vehicle axle, said shackle assembly comprising:
   a shackle bracket mounted to said vehicle frame member;
   a first shackle plate pivotally connected to said shackle bracket;
   a second shackle plate pivotally connected to said shackle bracket; and
   a redundancy feature in the form of a laterally extending member connecting said first and second shackle plates and being positioned between said first and second shackle plates and further being constructed and positioned to contact said shackle bracket and thereby prevent further pivoting of said first and second shackle plates in the event of a particular vehicle condition and when said vehicle is traveling in a predetermined direction and when said vehicle is subject to a predetermined force, said laterally extending member being a tube.

16. The shackle assembly as defined by claim 15 wherein said first shackle plate and said second shackle plate share a common pivot axis with respect to their pivotal connection with said shackle bracket.

17. The shackle assembly as defined by claim 15 further comprising a bushing installed within a bore positioned in said shackle bracket and a fastener inserted through said bushing, said fastener further being inserted through a bore positioned in said first shackle plate and through a bore positioned in said second shackle plate, and wherein said bushing and fastener enable said first and second shackle plates to be pivotally connected to said shackle bracket.

18. The shackle assembly as defined by claim 17 wherein the bushing is an elastomer bushing.

19. The shackle assembly as defined by claim 18 wherein the bushing has voids.

20. The shackle assembly as defined by claim 19 wherein the bushing is a bowtie bushing.

21. The shackle assembly as defined by claim 14 wherein said shackle bracket further comprises a downwardly extending leg forming a portion thereof, said leg providing a contact surface for said laterally extending member and being configured and positioned to provide lateral stiffness to said vehicle suspension.

22. The shackle assembly as defined by claim 21 wherein said shackle bracket further comprises another downwardly extending leg forming a portion thereof, said another leg providing another contact surface for said laterally extending member and being configured and positioned to provide lateral stiffness to said vehicle suspension.

23. The shackle assembly as defined by claim 22 further comprising a first wear pad positioned between said first shackle plate and said leg, and a second wear pad positioned between said second shackle plate and said another leg.

24. The shackle assembly as defined by claim 15 further comprising a first wear pad positioned between said first shackle plate and said shackle bracket, and a second wear pad positioned between said second shackle plate and said shackle bracket.

25. The shackle assembly as defined by claim 11 wherein said laterally extending member comprises a tube.

26. A shackle assembly for connecting a vehicle suspension to a vehicle frame member, the vehicle suspension being further connected to a vehicle axle, said shackle assembly comprising:
  a shackle bracket mounted to said vehicle frame member;
  a first shackle plate pivotally connected to said shackle bracket on a first side thereof and depending downwardly therefrom, said first shackle plate having a redundancy feature forming part of said first shackle plate and being positioned on one side of said first shackle plate and further being constructed and positioned to contact a vehicle component and thereby prevent further pivoting of said first shackle plate in the event of a particular vehicle condition when said vehicle is traveling in a predetermined direction and when said vehicle is subjected to a predetermined force; and
  a second shackle plate pivotally connected to said shackle bracket on a second side thereof opposite said first side of the shackle bracket, said second shackle plate depending from said shackle bracket.

27. The shackle assembly as defined by claim 26 wherein said first shackle plate and said second shackle plate share a common pivot axis with respect to their pivotal connection with said shackle bracket.

28. The shackle assembly as defined by claim 26 further comprising a bushing installed within a bore positioned in said shackle bracket and a fastener inserted through said bushing, said fastener further being inserted through a bore positioned in said first shackle plate and through a bore positioned in said second shackle plate, and wherein said bushing and fastener enable said first and second shackle plates to be pivotally connected to said shackle bracket.

29. The shackle assembly as defined by claim 28 wherein the bushing is an elastomer bushing.

30. The shackle assembly as defined by claim 29 wherein the bushing has voids.

31. The shackle assembly as defined by claim 30 wherein the bushing is a bowtie bushing.

32. The shackle assembly as defined by claim 26 wherein said shackle bracket further comprises a downwardly extending leg forming a portion thereof, said leg being configured and positioned to provide lateral stiffness to said vehicle suspension.

33. The shackle assembly as defined by claim 32 wherein said shackle bracket further comprises another downwardly extending leg forming a portion thereof, said another leg being configured and positioned to provide lateral stiffness to said vehicle suspension.

34. The shackle assembly as defined by claim 33 further comprising a first wear pad positioned between said first shackle plate and said leg, and a second wear pad positioned between said second shackle plate and said another leg.

35. The shackle assembly as defined by claim 26 further comprising a first wear pad positioned between said first shackle plate and said shackle bracket, and a second wear pad positioned between said second shackle plate and said shackle bracket.

36. The shackle assembly as defined by claim 26 further comprising another redundancy feature connecting said first and second shackle plates and being positioned between and on said one side of said first and second shackle plates and being constructed and positioned to contact a vehicle component and thereby prevent further pivoting of said first and second shackle plates in the event of said particular vehicle condition and when said vehicle is traveling in a direction generally opposite said predetermined direction and when said vehicle is subject to said predetermined force.

37. The shackle assembly as defined by claim 36 wherein said another redundancy feature is in the form of a laterally extending member.

38. The shackle assembly as defined by claim 37 wherein said shackle bracket further comprises a downwardly extending leg forming a part thereof, said leg being configured and positioned to provide a contact surface for said laterally extending member.

39. The shackle assembly as defined by claim 38 wherein said shackle bracket further comprises another downwardly extending leg forming a part thereof, said another leg being configured and positioned to provide another contact surface for said laterally extending member.

* * * * *